US007415265B2

(12) United States Patent
Noro et al.

(10) Patent No.: US 7,415,265 B2
(45) Date of Patent: Aug. 19, 2008

(54) PORTABLE ELECTRIC APPARATUS FOR RADIO BROADCASTING SIMPLE IN STRUCTURE AND ANTENNA DEVICE USED FOR THE APPARATUS

(75) Inventors: Junichi Noro, Akita (JP); Kyuichi Sato, Akita (JP); Toshiaki Aizawa, Akita (JP); Kenichi Taguchi, Akita (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 503 days.

(21) Appl. No.: 10/874,912

(22) Filed: Jun. 22, 2004

(65) Prior Publication Data

US 2005/0054320 A1    Mar. 10, 2005

(30) Foreign Application Priority Data

Sep. 9, 2003  (JP)  ............................. 2003-316308
Jan. 22, 2004  (JP)  ............................. 2004-014333

(51) Int. Cl.
*H04B 1/08*    (2006.01)
(52) U.S. Cl. ...................... 455/347; 455/575.7; 343/702
(58) Field of Classification Search ................. 455/347, 455/344, 575.1, 575.5, 575.7; 343/702, 700 M, 343/846; 369/75.1
See application file for complete search history.

(56) References Cited

U.S. PATENT DOCUMENTS

| 5,291,210 | A | * | 3/1994 | Nakase | ................. | 343/700 MS |
| 6,016,128 | A | * | 1/2000 | Imamura et al. | ............. | 343/741 |
| 6,295,462 | B1 | * | 9/2001 | Kudoh | ........................ | 455/41.3 |
| 2003/0003970 | A1 | * | 1/2003 | Johnson et al. | ............. | 455/569 |
| 2003/0152010 | A1 | * | 8/2003 | Liao et al. | .................. | 369/75.1 |

FOREIGN PATENT DOCUMENTS

| JP | 62-246195 A | 10/1987 |
| JP | 5-167345 A | 7/1993 |
| JP | 10-222975 A | 8/1998 |
| JP | 2003-163521 A | 6/2003 |

OTHER PUBLICATIONS

Japanese Office Action dated May 14, 2008 issued in counterpart Japanese Appln. No. 2004-014333 and English translation thereof.

* cited by examiner

*Primary Examiner*—Edward F. Urban
*Assistant Examiner*—Nhan T. Le
(74) *Attorney, Agent, or Firm*—Frishauf, Holtz, Goodman & Chick, P.C.

(57) ABSTRACT

In a portable electric apparatus comprising a radio tuner, an optical disc drive, a casing, and an antenna, the apparatus further comprises a lid arranged on a top surface of the casing. The lid is openable for taking the optical disc into and out from the optical disc drive. The antenna is mounted to the lid. An earth plate electrically connected to the antenna is mounted to the lid.

20 Claims, 5 Drawing Sheets

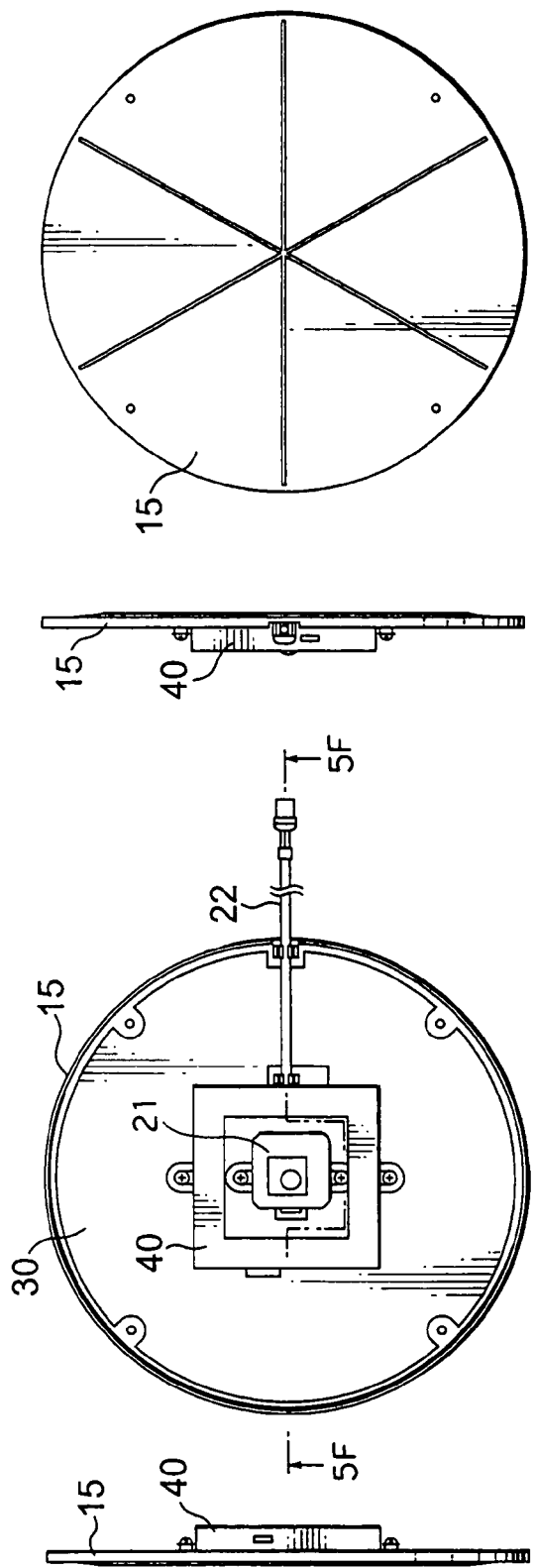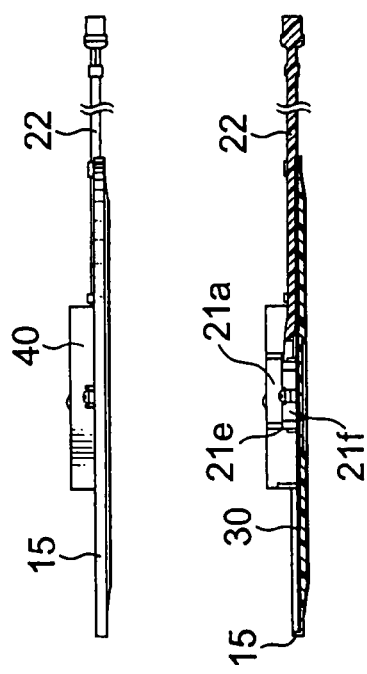
FIG. 5D
FIG. 5C
FIG. 5A
FIG. 5B
FIG. 5E
FIG. 5F

PORTABLE ELECTRIC APPARATUS FOR RADIO BROADCASTING SIMPLE IN STRUCTURE AND ANTENNA DEVICE USED FOR THE APPARATUS

This application claims priority to prior Japanese patent applications JP 2004-14333 and JP 2003-316308, the disclosures of which are incorporated herein by reference.

BACKGROUND OF THE INVENTION

The present invention relates to a portable electric apparatus and an antenna device used for the apparatus. The portable electric apparatus comprises a digital radio tuner, an optical disc drive, and a casing containing therein the digital radio tuner and the optical disc drive. The digital radio tuner can receive radio waves from an artificial satellite (hereinafter, may be called "satellite waves") and/or radio waves above ground (hereinafter, may be called "terrestrial waves") by an antenna, for listening to digital radio broadcasting (may be merely called "radio broadcasting"). The optical disc drive can reproduce data recorded in an optical disc such as a CD (Compact Disc). The optical disc drive may not only reproduce data from the optical disc but also record data in the optical disc or record and reproduce data in/from the optical disc.

Recently, a digital radio receiver receiving the satellite waves and/or the terrestrial waves for listening to the digital radio broadcasting is developed and is put to practical use in USA. This kind of digital radio receiver can receive radio waves of approximately 2.33 GHz and can be used for listening to the radio broadcasting. Therein, the terrestrial waves are provided by slightly shifting the satellite waves in frequency after once receiving one by an earth station.

As the digital radio receiver, there is various types, such as a vehicle-mounted type, a stationary type stationed in house, and a portable type operated by battery.

As the digital radio receiver of the portable type, there is specifically a portable electric apparatus such as a portable audio apparatus containing an optical disc drive the CD, an amplifier, and speakers in addition to the digital radio tuner in a casing in an integrated fashion.

As an antenna capable of receiving the radio waves of the approximately 2.33 GHz, various types of antennas have been known. The antennas are classified broadly by configuration into a flat type (plain plate type) such as a patch antenna and a cylindrical type such as a loop antenna. The patch antenna or the loop antenna is generally provided for the portable electric apparatus separately from the casing. The antenna is connected to the radio tuner via a cable and a connector and used.

Japanese Patent Application Publication (JP-A) No. 2003-163521 discloses an electric apparatus comprising a patch antenna. The patch antenna is not for the digital radio broadcasting but may be usable for satellite waves.

The advantage of the portable electric apparatus is that is portable readily by the user and usable anywhere. However, the existing portable electric apparatus having the antenna separated from the casing as mentioned above is not necessarily sufficient in portability.

SUMMARY OF THE INVENTION

Therefore, a technical object of the present invention is to provide a portable electric apparatus capable of receiving digital radio broadcasting which is simple in structure and portable readily.

Another object of the present invention is to provide the portable electric apparatus which can be manufactured at low cost.

Still another object of the present invention is to provide the portable electric apparatus excellent in receiving performance.

Still another object of the present invention is to provide an antenna device applicable for the above-mentioned portable electric apparatuses.

According to the present invention, there is provided a portable electric apparatus comprising a radio tuner, an optical disc drive, and a casing, the radio tuner receiving satellite waves and/or terrestrial waves by an antenna for listening to radio broadcasting, the optical disc drive driving an optical disc for reproducing data from the optical disc, the casing containing therein the radio tuner and the optical disc drive. The apparatus further comprises a lid arranged on a top surface of the casing. The lid is openable for taking the optical disc into and out from the optical disc drive. The antenna is mounted to the lid. An earth plate electrically connected to the antenna is mounted to the lid.

According to the present invention, there is also provided an antenna device comprising an antenna unit and an earth plate, the antenna unit comprising a circuit board an antenna element, and a shield case. The antenna element is provided with a radiation surface and a grand surface, the shield case shielding electric parts mounted on the circuit board. The area of the earth plate is larger than the bottom area of the antenna element. The antenna device is contained in a lid of a portable electric apparatus. The lid is openable for taking the optical disc into and out from the optical disc drive. The antenna unit is mounted on the earth plate.

Further structures and advantages of the present invention will become clear as the description proceeds.

BRIEF DESCRIPTION OF THE DRAWINGS

FIGS. 5A, 5B, 5C, 5D, and 5E are a top plan, a side elevational, another side elevational, a bottom plan, and the other side elevational views showing the relevant part of the portable electric apparatus shown in FIG. 4; and FIG. 5F is a cross sectional view of the relevant part of the portable electric apparatus along a section line 5F-5F shown in FIG. 5A.

DESCRIPTION OF THE PREFERRED EMBODIMENT

Hereinafter, preferred embodiments of the present invention will be concretely described with referent to the drawings.

First Embodiment

A portable electric apparatus according to a first embodiment of the present invention comprises a radio tuner, an optical disc drive, an audio amplifier, a speaker, and a casing. The radio tuner receives satellite waves and/or terrestrial waves by an antenna for listening to radio broadcasting. The optical disc drive reproduces data from an optical disc such as the CD. The optical disc drive may be recordable data to the optical disc. The casing contains therein the radio tuner, the optical disc drive, the audio amplifier, and the speaker.

The portable electric apparatus further comprises a power supply unit. The power supply unit includes a battery holder and a battery and is contained in the casing. The battery may be a rechargeable type. Furthermore, in order to realize the operation by commercial power source, the portable electric apparatus may comprises a power transformer and a rectifier.

Figure 1:
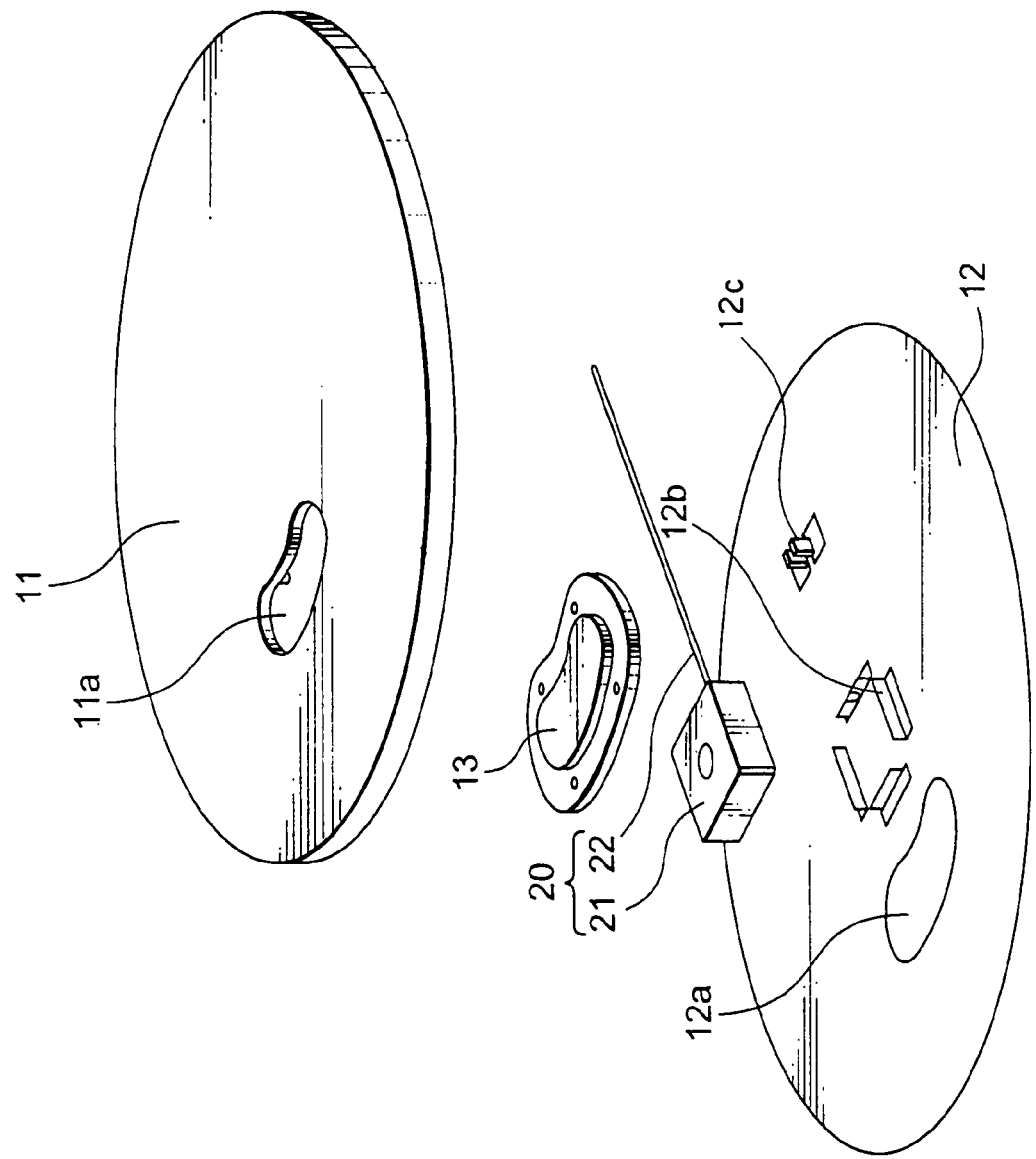
FIG. 1 is a disassembled perspective view showing a relevant part of a portable electric apparatus according to a first embodiment of the present invention.
Figure 2:
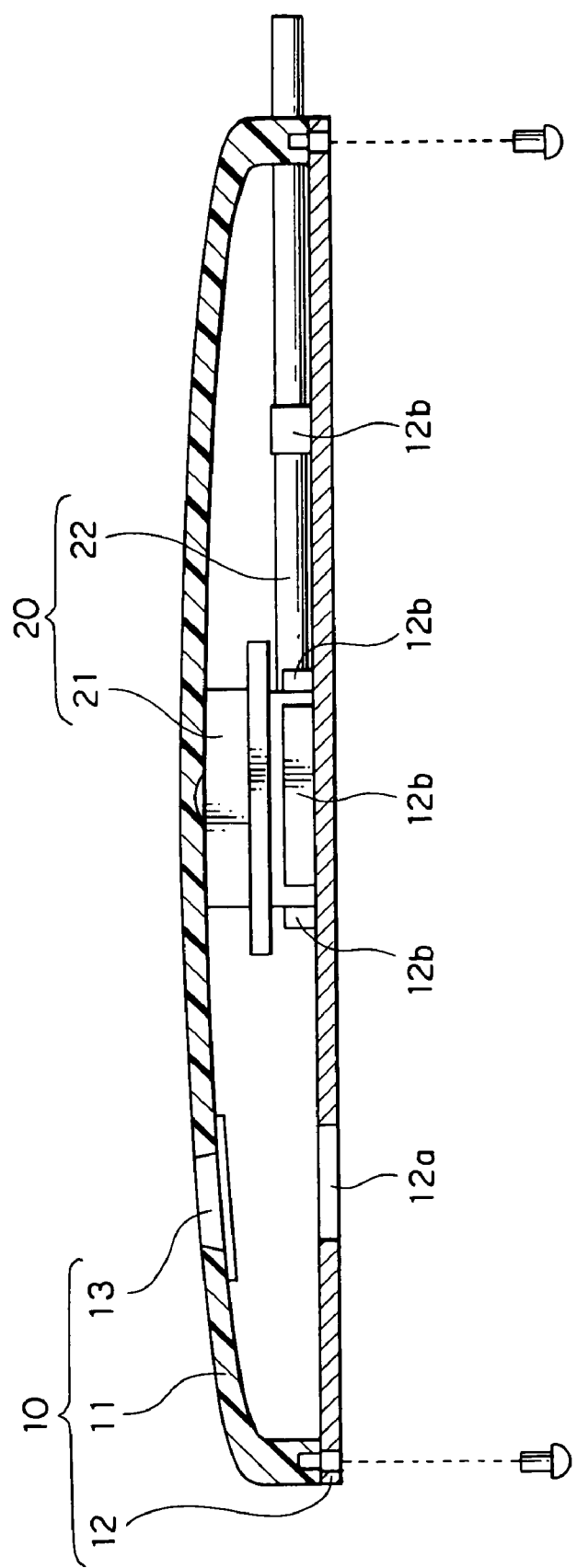
FIG. 2 is a cross sectional view showing the relevant part of the portable electric apparatus shown in FIG. 1.

Referring to FIGS. 1 and 2, the optical disc drive is provided with a lid 10. The lid 10 is arranged on a top surface of the casing. The lid 10 is provided with a hinge mechanism portion and is openable and closable for taking the optical disc into and out from the optical disc drive contained in the casing. The lid 10 performs around the hinge mechanism portion to open by spring elasticity or to open and close by an electric motor-operation.

In the present invention, the lid is not limited to that shown in FIGS. 1 and 2, if it is only provided to the top surface of the casing. For example, the lid may be opened and closed so as to swing or turn around the center axis extending in a vertical direction. Alternatively, the lid may be opened and closed by a slide operation along a track extending in a horizontal, an oblique, or a vertical direction. Furthermore, the lid may be opened rotatively or linearly by spring elasticity. Alternatively, the lid may be opened rotatively or linearly by an electric motor-operation.

The lid 10 comprises a top cover 11 made from resin, a bottom cover 12 made of electrical electrically conductive material, and a window member 13 made from transparent or semitransparent resin and attached to a slot 11a formed on the top cover 11. The bottom cover 12 is fixed to the top cover 11 by screw-clamping. The slot 11 corresponds to a slot 12a formed on the bottom cover 12 in location. Consequently, the window member 13 serves as a view or an observation window for viewing the presence of a CD loaded on a turntable of the optical disc drive and a rotation condition of the CD.

The patch antenna 20 is provided with an antenna portion 21 and a coaxial cable 22. The antenna portion 21 and a part of the coaxial cable 22 are contained in the lid 10. Because the antenna portion 21 is contained in the lid 10, it is unnecessary to provide an upper cover for the antenna portion 21 only. Consequently, the patch antenna 20 is simple in structure. The coaxial cable 22 is a multicore type which has a power supply line in addition to a signal line for transmitting a received signal received by the antenna portion 21.

Figure 3:
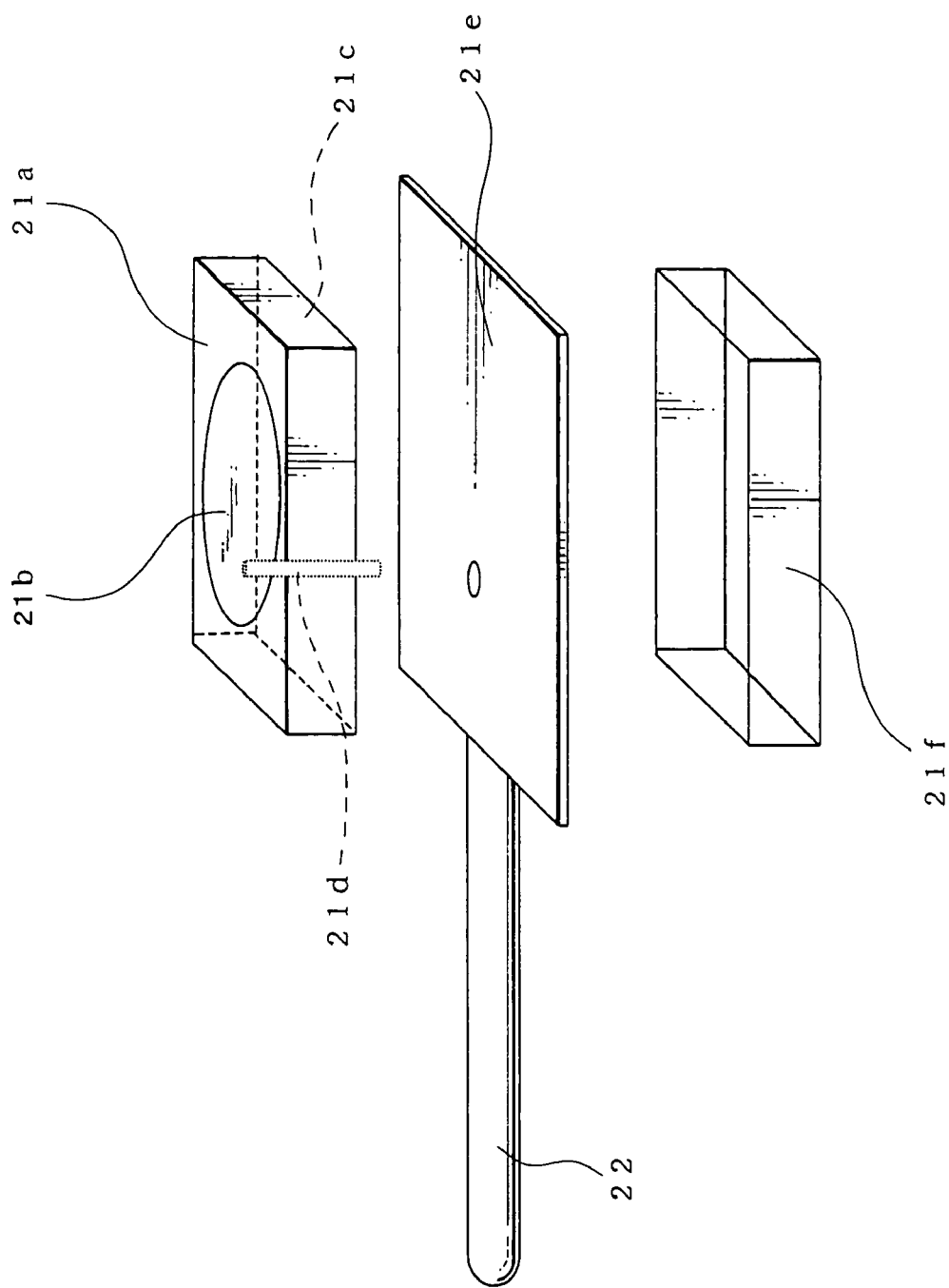
FIG. 3 is a disassembled perspective view showing an antenna device used for the portable electric apparatus according to the first embodiment and a portable electric apparatus according to a second embodiment of the present invention.
Figure 4:
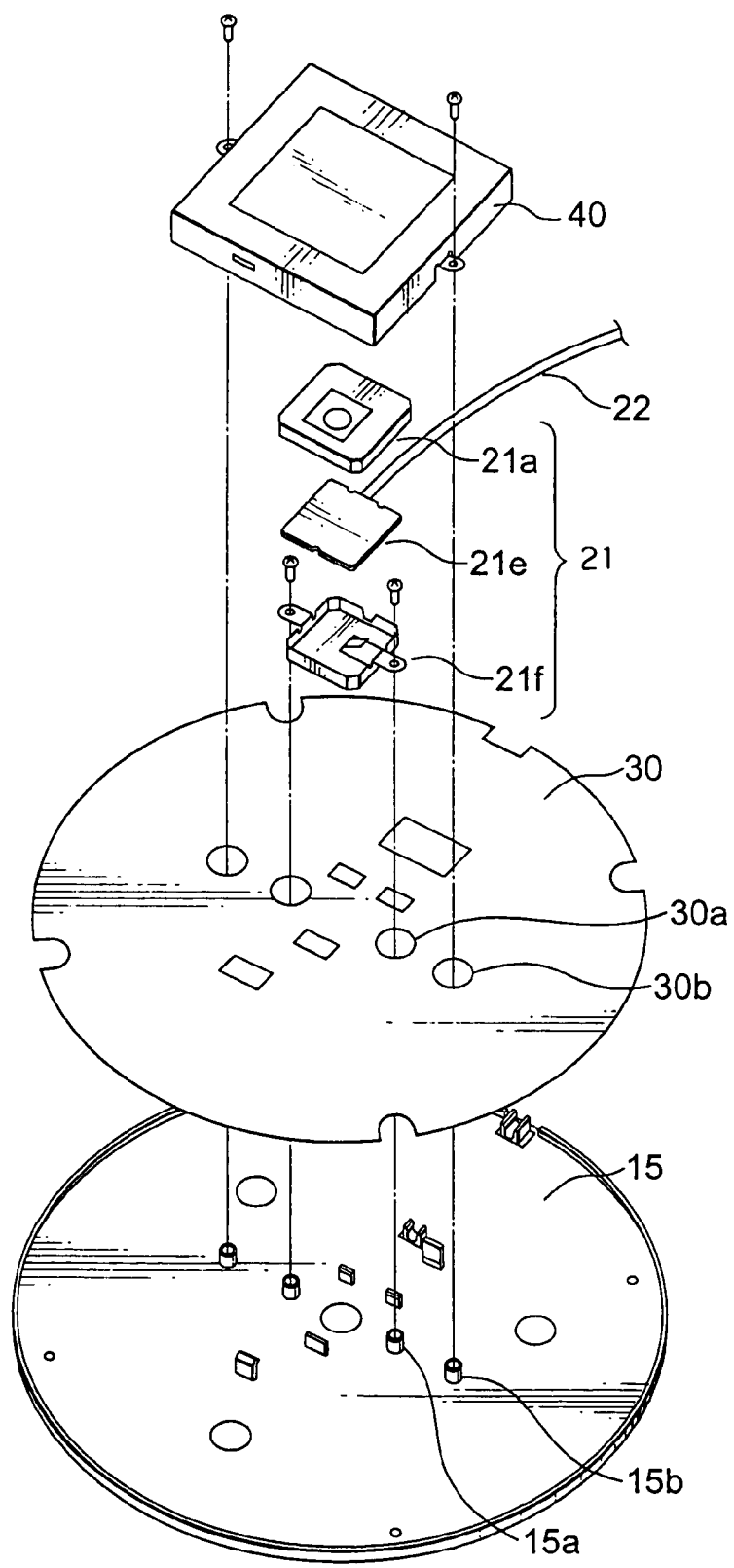
FIG. 4 is a disassembled perspective view showing a relevant part of the portable electric apparatus according to the second embodiment of the present invention.

In more detail, the antenna portion 21 is structured by an antenna element portion, an LNA (Low-Noise Amplifier circuit) board 21e, and a shield case 21f, as shown in FIG. 3.

The antenna element portion is provided with a dielectric substrate 21a made by material such as ceramic, a radiation portion 21b formed on a top surface of the dielectric substrate 21a, a ground (GND) layer 21 formed on a bottom surface of the dielectric substrate 21a, and a feeding pin 21d. The feeding pin 21d penetrates the dielectric substrate 21a in the thickness direction of the dielectric substrate 21a.

One end of the feeding pin 21d is connected to the radiation portion 21b with soldering. Furthermore, the other end of the feeding pin 21d is connected to the LNA board 21e with soldering. Consequently, the radiation portion 21b is fed electrical power from the LNA board 21e through the feeding pin 21d. Herein, the LNA board is fed electrical power from a power supply portion of the radio tuner through the coaxial cable 22.

The shield case 21f is used for shielding electric parts (not shown) mounted on a bottom surface of the LNA board 21e. Therefore, the shield case 21f is electrically connected to a ground pattern formed on the LNA board 21e.

The shield case 21f of the antenna portion 21 and the coaxial cable 22 are fixed to the bottom cover 12 by uprisen portions 12b and 12c, respectively. The uprisen portions 12b and 12c (FIG. 1) are integrally formed by cutting and bending a part of the bottom cover 12. Particularly, because the part of the antenna portion 21 contacting to the uprisen portion 12b of the bottom cover 12 is a part of the shield case 21f, the ground pattern and the ground layer 21c of the antenna portion 21 are electrically connected to the bottom cover 12.

Alternatively, the antenna portion 21 may be fixed on the bottom cover 12 by the use of not only the uprisen portion 12b but also adhesive or a two-sided (double-sided) adhesive tape. Furthermore, it may be fixed on the bottom cover 12 by the use of combination of the uprisen portion 12b and the adhesive or the two-sided adhesive tape.

The coaxial cable 22 is wired from the antenna portion 21 via the hinge mechanism portion to the radio tuner in the casing of the portable electric apparatus. In particular, it is preferred to contrive to avoid that the coaxial cable 22 obstructs opening and closing movements of the lid 10 or that the coaxial cable 22 is nipped or caught in the hinge mechanism portion and is therefore damaged. For example, the coaxial cable 22 is made of material having flexibility. Further, a relief portion for the coaxial cable 22 is formed on the hinge mechanism portion. Furthermore, the coaxial cable 22 is provided with a margin in length so that the coaxial cable 22 is not strained even when the lid 10 is full opened or full closed.

Alternatively, an FPC (Flexible Printed Cable or Flexible Printed Circuit cable) or an FFC (Flexible Flat Cable) may be used in combination with the coaxial cable 22. Namely, the FPC or the FFC is connected to the coaxial cable 22 extended from the antenna portion 21 in the lid 10 and is wired at least in the vicinity of the hinge mechanism portion toward the radio tuner. It is preferred to take for the FPC or the FFC sufficient countermeasures against extraneous noise.

The bottom cover 12 also serves as an earth plate for the antenna portion 21. The area of bottom cover 12 is wider than the area of the bottom surface of the antenna portion 21. In concrete, the area of bottom cover 12 is sufficiently wider than the area of the bottom surface of the antenna portion 21, as is clear from FIGS. 1 and 2. Furthermore, the antenna portion 21 is arranged or mounted at approximately center location of a top surface of the bottom cover 12.

Second Embodiment

A portable electric apparatus according to a second embodiment of the present invention also comprises a radio tuner, an optical disc drive, an audio amplifier, a speaker, and a casing containing therein them. The optical disc drive is provided with a lid arranged on a top surface of the casing. The lid is provided with a hinge mechanism portion and is openable and closable for taking the optical disc into and out from the optical disc drive contained in the casing.

Referring to FIGS. 4 and 5A to 5F, the lid of the portable electric apparatus comprises a top cover (not shown) made from resin, a bottom cover 15 made of electrical electrically conductive material, and an earth sheet 30 attached on the bottom cover 15 and including electrically conductive material.

On the earth sheet 30 attached on the bottom cover 15, a patch antenna is provided. The patch antenna is provided with an antenna portion and a coaxial cable 22. The antenna portion 21 and a part of the coaxial cable 22 are contained in the lid. Because the antenna portion 21 is contained in the lid, it is unnecessary to provide an upper cover for the antenna portion 21 only. Consequently, the patch antenna is simple in structure.

The antenna portion 21 comprises an antenna element portion, an LNA (Low-Noise Amplifier circuit) board 21e, and a shield case 21f, as like to the antenna portion shown in FIG. 3.

On the earth sheet 30 attached on the bottom cover 15, a metal frame 40 is further mounted. The metal frame 40 is structured by passive (, parasitic, or non-feed) conductor walls for shielding all surfaces of the antenna element portion exception of bottom and top surfaces of the antenna element portion. The passive conductor walls include four side walls and a picture frame-shaped top wall located on the top ends of the side walls. The metal frame 40 serves as a ground plate so as to ensure a directional characteristic on or over an elevation angle range.

The earth sheet 30 serves as an earth plate for the antenna portion 21. The area of earth sheet 30 is wider than the area of the bottom surface of the antenna portion 21. In concrete, the area of earth sheet 30 is sufficiently wider than the area of the bottom surface of the antenna portion 21, as is clear from FIGS. 4 and 5A to 5F. More concretely, the earth sheet 30 is profiled in a general disc shape with the diameter of 120 to 160 mm. Furthermore, the antenna portion 21 is arranged or mounted at approximately center location of a top surface of the earth sheet 30.

For example, the earth sheet 30 includes an aluminum material. The material of the earth sheet 30 is not limited to the aluminum and may be an electrically conductive material such that the earth sheet 30 can serve as the earth plate. Also, a electrically conductive material content in the earth sheet 30 may be amount such that the earth sheet 30 can serve as the earth plate. The thickness of the earth sheet 30 is 0.2 mm, for example. The thickness of the earth sheet 30 can be a thickness such that the earth sheet 30 can serve as the earth plate. On a reverse surface of the earth sheet 30, adhesive is applied. It is not indispensable that the adhesive previously applied on the earth sheet 30. For example, the adhesive can be applied on the earth sheet 30 when the earth sheet 30 is attached on the bottom cover 15. Alternatively, a double-faced adhesive tape can be used instead of the adhesive.

The bottom cover 15 is provided with bosses 15a and 15b formed on a top surface thereof. The earth sheet 30 is provided with hole portions 30a and 30b corresponding to the bosses 15a and 15b so as to avoid colliding with the bosses 15a and 15b. A combination of the bosses 15a and 15b of the bottom cover 15 and the hole portions 30a and 30b of the earth sheet 30 can serve as positioning means for attaching the earth sheet 30 on the bottom cover 15. The antenna portion 21 and the metal frame 40 are rigidly fixed on the boss 15a and the boss 15b of the bottom cover 15 by screwing, respectively. Alternatively, the antenna portion 21 and the metal frame 40 may be fixed on the bottom cover 15 without screwing. For example, the antenna portion 21 and the metal frame 40 can be engaged to and fixed on the bottom cover 15 by hooks. Although not shown in FIGS. 4 and 5a to 5F, the hooks can be formed on the top surface of the bottom cover 15 and can penetrate hole portions formed corresponding to the hooks on the earth sheet.

The second embodiment of the present invention intends to weight-save the antenna device and the portable electric apparatus by the use of the earth sheet. This intent is caused as follows. In the first embodiment of the present invention, the lid of the portable electric apparatus is opened by sprig elasticity and so on. However, because the bottom cover is made of metal sheet, the lid is heavy and may therefore inhibit the opening operation of the lid. In contrast, because the bottom cover is made from resin and therefore the lid is light in weight in the second embodiment, the opening operation of the lid is not inhibited. Further, because the earth sheet is attached on the bottom cover in the second embodiment, an earth function for the antenna is sufficiently performed as like to the first embodiment. Still further, the bottom cover relatively large in size is manufactured by injection molding as the same as the top cover. Consequently, the number of sheet metal working process and the manufacturing cost of components can be reduced and therefore the entire manufacturing cost of the portable electric apparatus can be also reduced.

In the present invention, instead of the earth sheet 30, a metal vapor deposition film may be formed on the top surface of the bottom cover 15 so as to serve as the earth plate for the antenna. However, a cost involved with a metal vapor deposition process is costly at present. Therefore, the use of the earth sheet is more advantageous than the use of the metal vapor deposition film, in order to reduce in cost the portable electric apparatus.

In the first or the second embodiment of the present invention, so that the apparatus and the unit are excellent in receiving performance of the digital radio broadcasting, the apparatus and the antenna unit comprise the bottom cover 12 compatible-serving as the earth plate or the earth sheet 30 serving as the earth plate. The bottom cover 12 and the earth sheet 30 is large or wide in area. The antenna for the satellite waves or the terrestrial waves of the digital radio broadcasting involves a high sensitivity, a large gain, and a high directivity in a required direction relative to the antenna for the terrestrial waves of an analogue radio broadcasting. In particular, if the earth plate, particularly a wide-area earth plate, is provided to a bottom surface of the patch antenna, the patch antenna is remarkably improved in the directivity on a top end side of the antenna and therefore the receiving performance of the patch antenna also remarkably improved. For example, this is mentioned and shown in JP 2003-163521 A (FIGS. 3(a), 3(b) and 4 and description thereof).

So far, the present invention has been described in conjunction with several examples. However, the present invention is not restricted to the examples mentioned above but may be modified in various manners by those skilled in the art within the scope of the present invention.

For example, the portable electric apparatus according to the present invention is not limited to the portable audio apparatus such as the CD player. Namely, the portable electric apparatus according to the present invention may be an apparatus such as a portable DVD (Digital Video Disc or Digital Versatile Disc) video player comprising a DVD drive and an LCD (Liquid Crystal Display) and capable of receiving the digital radio broadcasting, a portable GPS (Global Positioning System) navigation apparatus comprising a DVD-ROM (DVD-Read Only Memory) drive and an LCD (Liquid Crystal Display) and capable of receiving the digital radio broadcasting, or a complex apparatus of these apparatuses.

Furthermore, the antenna device according to the present invention is not limited to the patch antenna for the digital radio broadcasting. Namely, even if the antenna device according to the present invention has size and shape so that it can be mounted on or contained in the lid of the optical disc drive, the antenna device may be an antenna such as of various shapes, for various broadcasting systems, or for a radio LAN (Local Area Network).

While this invention has thus far been described in conjunction with the preferred embodiments thereof, it will be readily possible for those skilled in the art to put this invention into practice in various other manners without departing from the scope of this invention.

What is claimed is:

1. A portable electric apparatus comprising:
   a radio tuner which receives at least one of satellite waves and terrestrial waves by an antenna;
   an optical disc drive which drives an optical disc to reproduce data from the optical disc;
   a casing containing therein said radio tuner and said optical disc drive;
   a lid arranged on a top surface of said casing, wherein said lid is openable to place the optical disc into and remove the optical disc out from said optical disc drive; and
   an earth plate electrically connected to said antenna;
   wherein said antenna is mounted to said lid, and said antenna comprises:
   an antenna unit; and
   wherein the antenna unit comprises:
      a circuit board;
      an antenna element, which is mounted on an upper surface of the circuit board, and which comprises a dielectric substrate, a radiation surface formed on a top surface of the dielectric substrate, and a ground surface formed on a bottom surface of said dielectric substrate; and
      a shield case which shields electric parts mounted on a bottom surface of said circuit board;
   wherein the earth plate has an area which is larger than a bottom area of said antenna unit;
   wherein the antenna device is contained in the lid; and
   wherein said antenna unit is mounted on said earth plate.

2. The portable electric apparatus as claimed in claim 1, wherein said lid comprises a bottom cover made of sheet metal; and
   wherein said antenna is mounted on said bottom cover, and said bottom cover serves as said earth plate.

3. The portable electric apparatus as claimed in claim 2, wherein said antenna is fixed on said bottom cover by a plurality of uprisen portions integrally formed on said bottom cover.

4. The portable electric apparatus as claimed in claim 2, wherein said antenna and said bottom cover are electrically connected to each other by soldering.

5. The portable electric apparatus as claimed in claim 1, wherein said lid comprises a bottom cover made from resin and an earth sheet, which includes an electrically conductive material and which is attached to said bottom cover; and
   wherein said antenna is mounted on said bottom cover, and said earth sheet serves as said earth plate.

6. The portable electric apparatus as claimed in claim 5, wherein said bottom cover is provided with a boss formed on a top surface thereof;
   wherein said earth sheet is provided with a hole portion formed in a region thereof corresponding to said boss; and
   wherein said antenna is fixed on said boss by a screw.

7. The portable electric apparatus as claimed in claim 5, wherein said bottom cover is provided with a plurality of hooks formed on a top surface thereof;
   wherein said earth sheet is provided with a plurality of hole portions formed therein to correspond respectively to said hooks; and
   wherein said antenna is fixed on said bottom cover by said hooks.

8. The portable electric apparatus as claimed in claim 1, wherein said antenna is arranged on said earth plate at approximately a center region of said earth plate.

9. The portable electric apparatus as claimed in claim 1, wherein said earth plate is shaped as a circle that is 120 to 160 mm in diameter.

10. The portable electric apparatus as claimed in claim 5, wherein said earth sheet is an aluminum sheet having a thickness of 0.2 mm.

11. An antenna device comprising:
    an antenna unit; and
    an earth plate;
    wherein the antenna unit comprises:
       a circuit board;
       an antenna element, which is mounted on an upper surface of the circuit board, and which comprises a dielectric substrate, a radiation surface formed on a top surface of the dielectric substrate, and a ground surface formed on a bottom surface of said dielectric substrate; and
       a shield case which shields electric parts mounted on a bottom surface of said circuit board;
    wherein the earth plate has an area which is larger than a bottom area of said antenna unit;
    wherein the antenna device is contained in a lid of a portable electric apparatus that includes an optical disc drive;
    wherein the lid is openable to place an optical disc into and remove the optical disc out from said optical disc drive; and
    wherein said antenna unit is mounted on said earth plate.

12. The antenna device as claimed in claim 11, wherein said lid comprises a bottom cover made of sheet metal; and
    wherein said antenna unit is mounted on said bottom cover, and said bottom cover serves as said earth plate.

13. The antenna device as claimed in claim 12, wherein said antenna unit is fixed on said bottom cover by a plurality of uprisen portions integrally formed on said bottom cover.

14. The antenna device as claimed in claim 12, wherein said antenna element and said bottom cover are electrically connected to each other by soldering.

15. The antenna device as claimed in claim 11, wherein said lid comprises a bottom cover made from resin and an earth sheet, which includes an electrically conductive material and which is attached to said bottom cover; and
    wherein said antenna unit is mounted on said bottom cover, and said earth sheet serves as said earth plate.

16. The antenna device as claimed in claim 15, wherein said bottom cover is provided with a boss formed on a top surface thereof;
    wherein said earth sheet is provided with a hole portion formed in a region thereof corresponding to said boss; and
    wherein said antenna unit is fixed on said boss by a screw.

17. The antenna device as claimed in claim 15, wherein said bottom cover is provided with a plurality of hooks formed on a top surface thereof;

wherein said earth sheet is provided with a plurality of hole portions formed therein to correspond respectively to said hooks; and wherein said antenna unit is fixed on said bottom cover by said hooks.

18. The antenna device as claimed in claim 11, wherein said antenna unit is arranged on said earth plate at approximately a center region of said earth plate.

19. The antenna device as claimed in claim 11, wherein said earth plate is shaped as a circle that is 120 to 160 mm in diameter.

20. The antenna device as claimed in claim 15, wherein said earth sheet is an aluminum sheet having a thickness of 0.2 mm.

* * * * *